H. A. MYERS.
POWER CONTROLLING MECHANISM.
APPLICATION FILED OCT. 23, 1914.
1,167,101.
Patented Jan. 4, 1916.
2 SHEETS—SHEET 1.
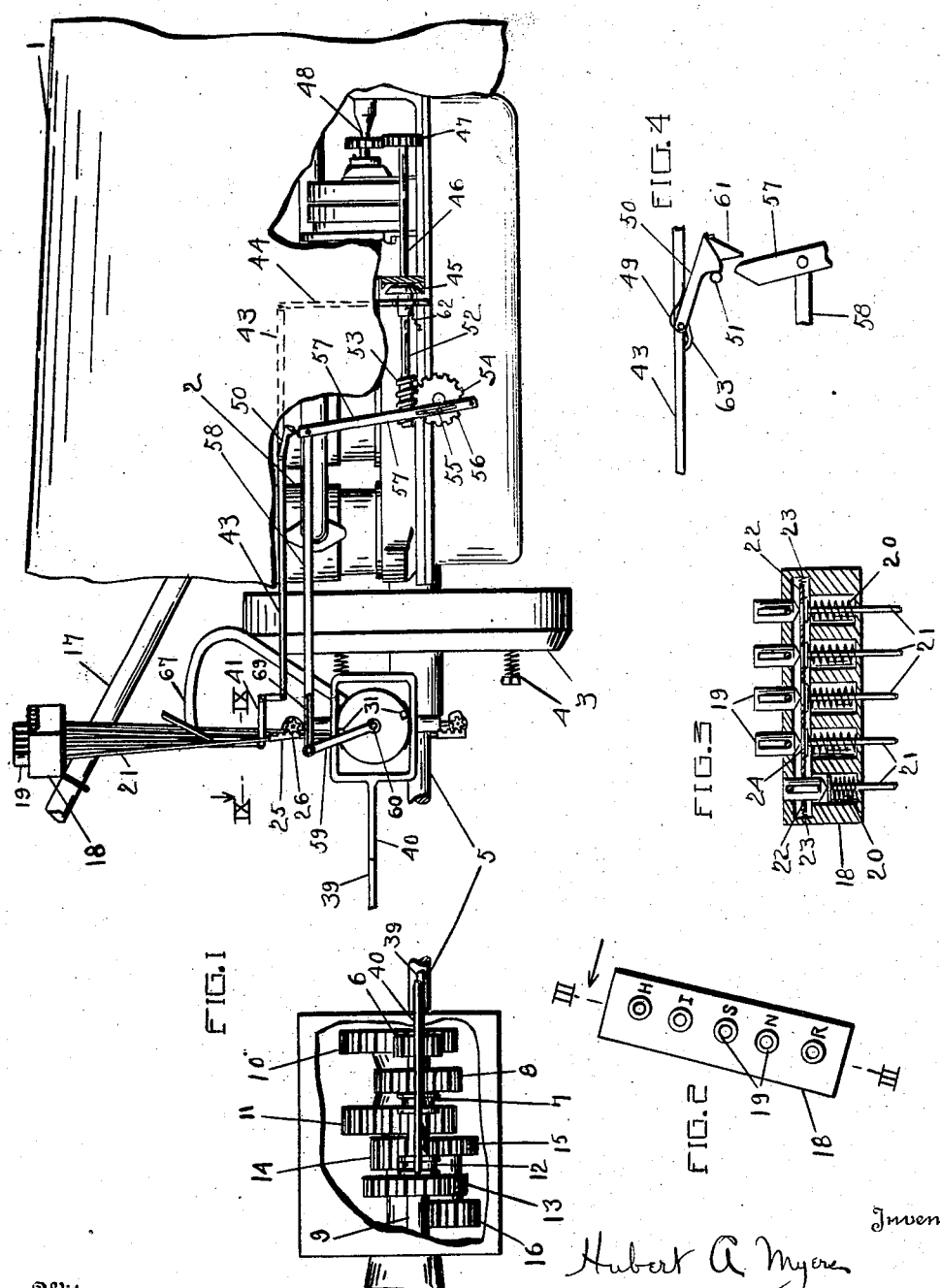

H. A. MYERS.
POWER CONTROLLING MECHANISM.
APPLICATION FILED OCT. 23, 1914.
1,167,101.
Patented Jan. 4, 1916.
2 SHEETS—SHEET 2.
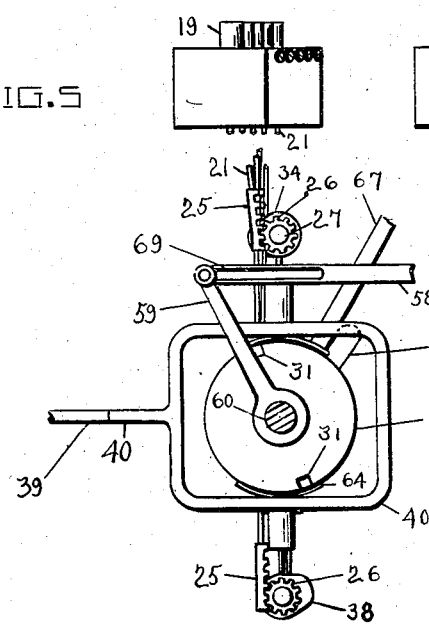
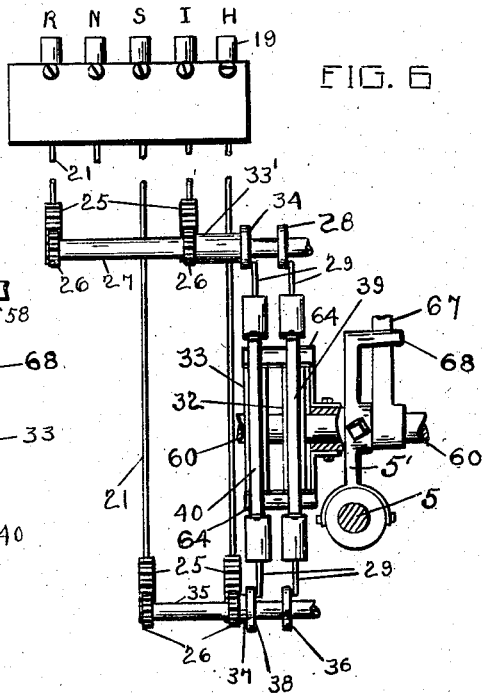
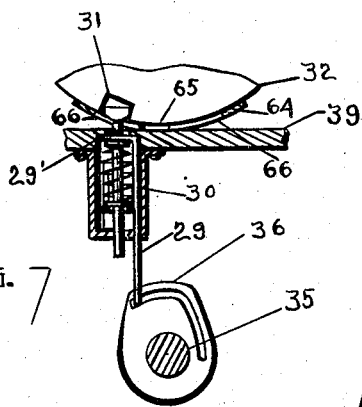
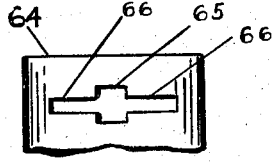
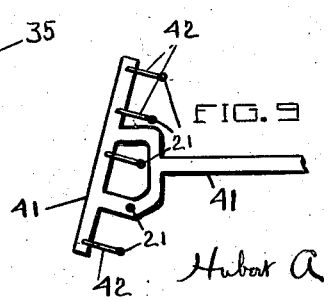

UNITED STATES PATENT OFFICE.

HUBERT A. MYERS, OF TOLEDO, OHIO, ASSIGNOR OF ONE-HALF TO ALBERT A. ATWOOD, OF TOLEDO, OHIO.

POWER-CONTROLLING MECHANISM.

1,167,101.  Specification of Letters Patent.  Patented Jan. 4, 1916.

Application filed October 23, 1914. Serial No. 868,183.

*To all whom it may concern:*

Be it known that I, HUBERT A. MYERS, a citizen of the United States of America, residing at Toledo, Lucas county, Ohio, have invented new and useful Power-Controlling Mechanisms, of which the following is a specification.

This invention relates to power controlling mechanisms.
This invention has utility when embodied as a push button controller for shifting the gears to change the speed of motor vehicles.

Referring to the drawings Figure 1 is a fragmentary side elevation of an adaptation of the device to an internal combustion engine propelled motor vehicle; Fig. 2 is a plan view of the selector plate or push button grouping; Fig. 3 is a section on the line III—III, Fig. 2; Fig. 4 is a detail on an enlarged scale of the automatic catch and release for the power driven gear shift driving means; Fig. 5 is a side elevation on an enlarged scale of portions of the selector and its operative connections with the power driven actuator; Fig. 6 is a view looking from the right toward the selector and actuator of Fig. 5; Fig. 7 is a fragmentary view, on an enlarged scale of the selected shift bar connection to an actuator, the parts being in shifted position, the view being from the opposite side of the actuators from the showing in Fig. 5; Fig. 8 is a plan view of one of the lower guides or keeps retaining an actuator and shift bar connected when away from neutral or disconnecting position; and Fig. 9 is a view on the line IX—IX, Fig. 1, showing the connection whereby each push button is effective to operate the power driving means simultaneously with the selection action by the vehicle driver, whereby the simple push button serves as a remote control device for the variable speed transmission gearing.

The motor vehicle 1 is provided with the motor 2 and has the clutch 3 normally held in driving relation by the springs 4 to actuate the driving member or shaft 5. Mounted on the after end of the shaft 5 is the pinion 6. Shifting of the collar 7 may bring the opposing gear wheel 8 into direct or high speed driving connection with the clutch on the lateral face of the gear 6, while opposite direction shifting of the gear 8, instead of driving the shaft 9 at high speed will drive at second or intermediate speed through the gear 6 meshing with the gear 10 driving the gear 11 now in mesh with the gear 8. Shifting of the collar 12 forwardly will bring the gear 13 into mesh with the gear 14 driven through the gear 10, and thus drive the shaft 9 at first speed forward or slow. Rearward shifting of the gear 13 will result in transmission from the gear 14, through the gears 15, 16, 13, and rotate the shaft 9 in a reverse direction, for backing the vehicle.

Mounted in a convenient position for the vehicle driver, as say on the steering post 17, is the selector comprising the housing 18 for the push buttons 19, in this instance one push button being shown for each speed relation of the transmission mechanism or variable speed gearing. Springs 20 urge the rods 21 upward, and thereby tend to keep the push buttons lifted to initial or starting positions at all times. The plate 22, normally centered by the springs 23, precludes depression of more than one push button 19 at a time, for the openings 24 through the plate 22 are spaced slightly different from the push button spacing. With no push button down, the holes 24 are each sufficiently central as to each button 19 so that any one may be depressed, shift the plate 22 and snugly pass through its opening 24 to actuate a rod 21, but in so doing each of the other openings 24 is locked off center as to its push button thereby precluding depression of a second button 19 while one is in action. Each rod 21 extends to carry at its lower end a rack 25 in mesh with a pinion 26. The R push button 19 has its pinion 26 on the shaft 27 to rock the cam 28, and thereby move a pin 29 against the resistance of a spring 30 to thrust its head 29' into the tooth notch 31 of the actuator 32. Depression of the rod 21 by the I push button, will operate its pinion 26 on the sleeve 33' to rock its cam 34, for depressing its pin 29 and thereby engage the notch 31 in the actuator 33. The push button S has its pinion 26 on the shaft 35 for rocking the cam 36 to effect engagement of a head 29' with the lower side of the actuator 32, while push button H for high or third speed forward is connected by its pinion 26 through the sleeve 37 to actuate the cam 38 for throwing a head 29' into engagement with the lower notch 31 of actuator 33.

The yoke 39 carrying the heads 29' which may be shifted to engage the actuator 32, is connected to the shift collar 12, while the yoke 40 about the actuator 33 is connected to the collar 7. These push button, rack, cam and tooth connections complete the selection for the desired driving relation connection, and simultaneously with this selection operation, these devices serve as a remote control of driving or power means, in this instance driven from the motor for automatically operating connections completing the gear shift or change of speed. The N push button 19 in its depression contacts the angle lever 41 directly, and is provided with no rack 25, on its rod 21. The end of the lever 41 is angular to conform to the positions of the rods 21 extending to the box or housing 18, in this instance skewed for convenient mounting on the steering column 17. The rods 21 for the other push buttons are provided with pins 42, so that in the depression of any push button, simultaneously the angle lever 41 is rocked to move the link 43 forwardly and thereby through the lever 44 set the clutch 45 for driving off the continuously running shaft 46 connected by the gear 47 say to be driven off the magneto shaft 48.

In the forward travel of the link 43, the spring 49 acting upon the dog 50 causes it to engage the fixed pin 51, thereby holding the clutch 45 in driving relation. The clutch 45 drives the shaft 52 carrying the worm 53 in mesh with the worm wheel 54 carrying the crank pin 55 engaging in the slot 56 of the lever 57, oscillated by the rotation of the worm wheel 54 to pull the link 58 forward, and with it the arm 59 fast on the shaft 60 upon which the actuators 32, 33, are fixed. The disposal of the lever 57 is such that in the downward travel of the pin 55, the travel forward of the link 58 is much more rapid than its return. It is effective in this forward travel to release the clutch 3, by rocking the shaft 60 and with it the yoke 5', and still have the travel of the engaged yoke 39, 40 quite rapid during the entire forward travel of the link 58, and even during the first portion of the return or rearward travel of the link 58, the latter portion of the return during the balance of the upper arc of the wheel 54, being slower. With this variation in the travel rate, the clutch 3 may be quickly disconnected, the connected gear quickly brought to neutral by the yoke 39 or 40 away from neutral or disconnected position, the compressed spring 30, quickly acting to connect up the selected yoke for quick connecting up of the gear selected, and then the slower travel as the clutch 3 is allowed to gradually take hold by the springs 4 acting against the retarded travel of the link 58. When the lever 57 approaches completion of its cycle of travel, it strikes the hinged extension 61 on the dog 50, forcing the dog 50 off the pin 51, so the spring 62 may operate to release the clutch 45 from driving position. The extension 62 prevents the dog 50 from falling too low, and the extension 61, being hinged, permits the lever 57 to swing forward in starting a second cycle without disconnecting the clutch 45.

The fixed guides 64 upon which ride the yokes 39, 40 have the central openings 65 which permit the heads of the pins 29 to pass through only at neutral position, and the slots 66 extending therefrom, preclude disengagement of a connected pin 29 at other than neutral position, as well as keep a pin 29 from engaging at other than neutral position, thereby insuring proper connection of the actuators 32, 33 at all times.

Thrusting forward of the clutch pedal 67, loose on the shaft 60, causes it to strike the arm 68, fast on the shaft 60, and not only act against the resistance of the springs 4 to release the clutch 3 from driving relation by shifting the yoke 5', but bring any connected gear to neutral or disconnected position, for rocking of the shaft 60 carries with it the actuators 32, 33, and if any gear is shifted, then its yoke 39, 40, is connected to an actuator which will draw such gear to neutral or disconnecting position in this forward thrusting of the pedal 67. The slot 69 in the link 58 permits this travel of the actuators 32, 33, independently of the worm drive for the actuators.

In operation, the clutch pedal 67 is free at all times for operation, and is effective to disconnect the main clutch 3, and follow this action on the forward stroke, by bringing the yokes 39, 40 to neutral or disconnecting position. Return of the clutch pedal by the springs 4 acting from the clutch 3 upon the yoke 5' through the arm 68 will connect the clutch 3, but leave the transmission gearing disconnected ready for the selection and connection of any desired speed independently of the pedal 67. The first action produced by thrusting the one direction driving relation selector or pedal 67 forward is the release of the clutch 3. Accordingly, if the pedal 67 is not pushed forward fully, although the clutch is released, the driving gear connection is not disturbed, for the actuator is not moved to disconnecting position and the pin 29 connected up may not be withdrawn by its spring 30, owing to the guide 66 still holding the head of the pin 29 in the notch 31 of the actuator.

Independently of any attention to the pedal 67, the speed may be changed to neutral or any driving relation, merely by depressing the push button 19 for the selected driving relation.

Depression of a push button 19, first brings the opening 24 for the depressed button in the plate 22 central of such depressed button, thus at once automatically locking out all of the other buttons 19. Were an initial effort made to depress more than one button, neither would go down, as each would lock the other from passing the plate 22. In passing through the opening 24 in the plate 22, the push button 19 acts upon its rod 21 against the action of a compression spring 20, and in the continued travel directly actuates a rack 25 to bring the selected cam to force toward an actuator one of the pins 29. The push button 19 should be held depressed until the spring 30 may thrust the head 29' through the opening 65 into the notch 31. As soon as the actuator has rocked away from neutral position sufficiently for the slot 66 to retain the head 29' from withdrawal from the notch 31, the push button 19 may be released. This time interval in depressing the push button may be of short duration, for at once upon the depression of the button, the lever 41 is rocked, to cause the link 43 through the lever 44 to place the clutch 45 in driving relation as to the worm 53 actuating the worm wheel 54 carrying the wrist pin 55 coacting in the slot 56 to quickly shift the lever 57 and with it the link 58 to pull the arm 59 forward, and with it the shaft 60 having the yoke 5' effective in releasing the clutch 3, against the resistance of the springs 4. The arm 59, in its further travel, actuates the shaft 60 to complete the pull to neutral of any shifted actuator. The spring 30 at once brings the head 29' out of the notch 31 and through the notch 65, the selected head 29' being simultaneously thrust through a notch 65 in a plate 64 into engaging position with a notch 31 in an actuator and the shifting of the gears may be started. The pin 55 is now passing through its longer radius position as to the lever 57, and there is consequently slower travel in the return movement of the link 58 allowing the clutch 3 to take hold again. At this completion of the cycle of travel of the lever 57, it knocks the dog 50 off the pin 51, and the now idle driving worm 53 locks the link 58 against travel. The springs 4 hold the actuators in shifted position, and slots 66 preclude disengagement away from neutral.

What is claimed and it is desired to secure by Letters Patent is:

1. Mechanism for establishing a plurality of driving relations, driving means for effecting a complete change from a driving relation of the mechanism to another, separate selectors for different driving relations, and a selector controlled device co-acting with the driving means for bringing about action of the driving means to effect the selector determined driving relation of the mechanism from the previous driving relation of the mechanism.

2. Mechanism for establishing a plurality of driving relations, power means for effecting a complete change from a driving relation to disconnecting relation and back to driving relation, a device for connecting the power means to effect a complete change in the driving relation of the mechanism, and a one direction manually actuated driving relation selector in itself determining the change selection and effecting the device and power means operation.

3. Mechanism for establishing a plurality of driving relations, driving means for effecting the changes to different driving relations of the mechanism, a device for connecting the driving means to effect a driving relation of the mechanism, driving relation selectors for controlling the device, and means precluding a second selection until the first selection is effected.

4. Mechanism for establishing a plurality of driving relations, a push button selector for the driving relations of the mechanism, and a driving relation change disconnecting and connecting device actuated by the selector.

5. Mechanism for disestablishing and establishing a plurality of driving relations, and a mechanical remote control device therefor embodying a driving relation disestablishing and establishing push button.

6. Mechanism for disestablishing and establishing a plurality of driving relations, and a mechanical remote control device therefor embodying a one motion selector and driving means actuated by the one motion selector for disestablishing and establishing a driving relation.

7. Mechanism for establishing a plurality of driving relations, and a remote control device therefor embodying a push button selector and driving means for disestablishing and establishing driving relations for the mechanism, said means actuable by a push button of the selector.

8. A driving member, a driven member, mechanism for establishing a plurality of driving relations therebetween, and dual independently movable means for bringing the mechanism to disconnecting position, including a disconnecting clutch between the members operable with each of said means.

9. A driving member, a driven member, mechanism for establishing a plurality of driving relations therebetween, two independently movable means for bringing the mechanism to disconnecting position, one of which means having connections for bringing the mechanism to a driving relation position, and a disconnecting clutch between the members coacting with said means to be operable with either thereof.

10. A driving member, a driven member, mechanism for establishing a plurality of driving relations therebetween, a clutch between the members, a single motion remote control device for bringing the mechanism to disconnecting position and to a driving relation position, and independent means operable with said clutch at any time to bring the mechanism to disconnecting position.

11. Mechanism for establishing a plurality of driving relations for a motor vehicle embodying a clutch pedal, a power device, and a remote control device to connect the power device for different actuations of the mechanism effective independently of the pedal.

12. Mechanism for establishing a plurality of driving relations for a motor vehicle embodying a clutch pedal, a push button device for changing the driving relations of the mechanism independently of the pedal and a power device controlled by the push button device for effecting different driving relations.

13. A driving member, a driven member, mechanism for establishing a plurality of driving relations therebetween, a clutch between the members, driving means for disconnecting the clutch and for effecting a complete change from a driving relation of the mechanism to another, a selector for a driving relation, and a selector controlled device connecting the driving means for bringing about action of the driving means to effect clutch disconnection and the selector determined driving relation of the mechanism from the previous driving relation of the mechanism.

14. A driving member, a driven member, a clutch therebetween, mechanism for establishing a plurality of driving relations, said mechanism disposed between the clutch and driven member, and a driving relation selector in itself determining the driving relation selection and provided with connections effecting the clutch and mechanism operations.

15. A driving member, a driven member, mechanism for establishing a plurality of driving relations therebetween, a clutch for connecting and disconnecting one of the members, power means for effecting a complete change from a driving relation to disconnecting relation and back to driving relation, connections from the power means to control the clutch, a device for connecting the power means to effect a complete change in the driving relation of the mechanism, and a driving relation selector in itself determining the driving relation selection and effecting the device, clutch and power means operation.

16. A driving member, a driven member, mechanism for establishing a plurality of driving relations therebetween, a clutch for connecting and disconnecting one of the members, separate selectors for the different driving relations, and connections from the selector determining the driving relation selection and effecting mechanism and clutch operation.

17. A driving member, a driven member, mechanism for establishing a plurality of driving relations therebetween, a clutch for connecting and disconnecting one of the members, and a push button provided with connections for operating the clutch and mechanism.

18. A driving member, a driven member, mechanism for establishing a plurality of driving relations therebetween, a clutch for connecting and disconnecting one of the members, and a driving relation selecting controller provided with connections for operating the clutch and mechanism.

19. A driving member, a driven member, mechanism for establishing a plurality of driving relations therebetween, a clutch for connecting and disconnecting one of the members, and a driving relation selecting controller provided with connections for simultaneously operating the clutch and mechanism.

20. A driving member, a driven member, mechanism for establishing a plurality of driving relations therebetween, a clutch for connecting and disconnecting one of the members, a driving relation selecting controller, and connections actuable in a single movement of the controller for operating the clutch and mechanism.

In testimony whereof I affix my signature in the presence of two witnesses.

HUBERT A. MYERS.

Witnesses:
GEO. E. KIRK,
C. H. RAUCH.

Copies of this patent may be obtained for five cents each, by addressing the "Commissioner of Patents, Washington, D. C."

It is hereby certified that in Letters Patent No. 1,167,101, granted January 4, 1916, upon the application of Hubert A. Myers, of Toledo, Ohio, for an improvement in "Power-Controlled Mechanisms," an error appears in the printed specification requiring correction as follows: Page 3, line 89, claim 4, strike out the word "change;" and that the said Letters Patent should be read with this correction therein that the same may conform to the record of the case in the Patent Office.

Signed and sealed this 25th day of January, A. D., 1916.

[SEAL.]

R. F. WHITEHEAD,
*Acting Commissioner of Patents.*

Cl. 74—58.